Figure 2:
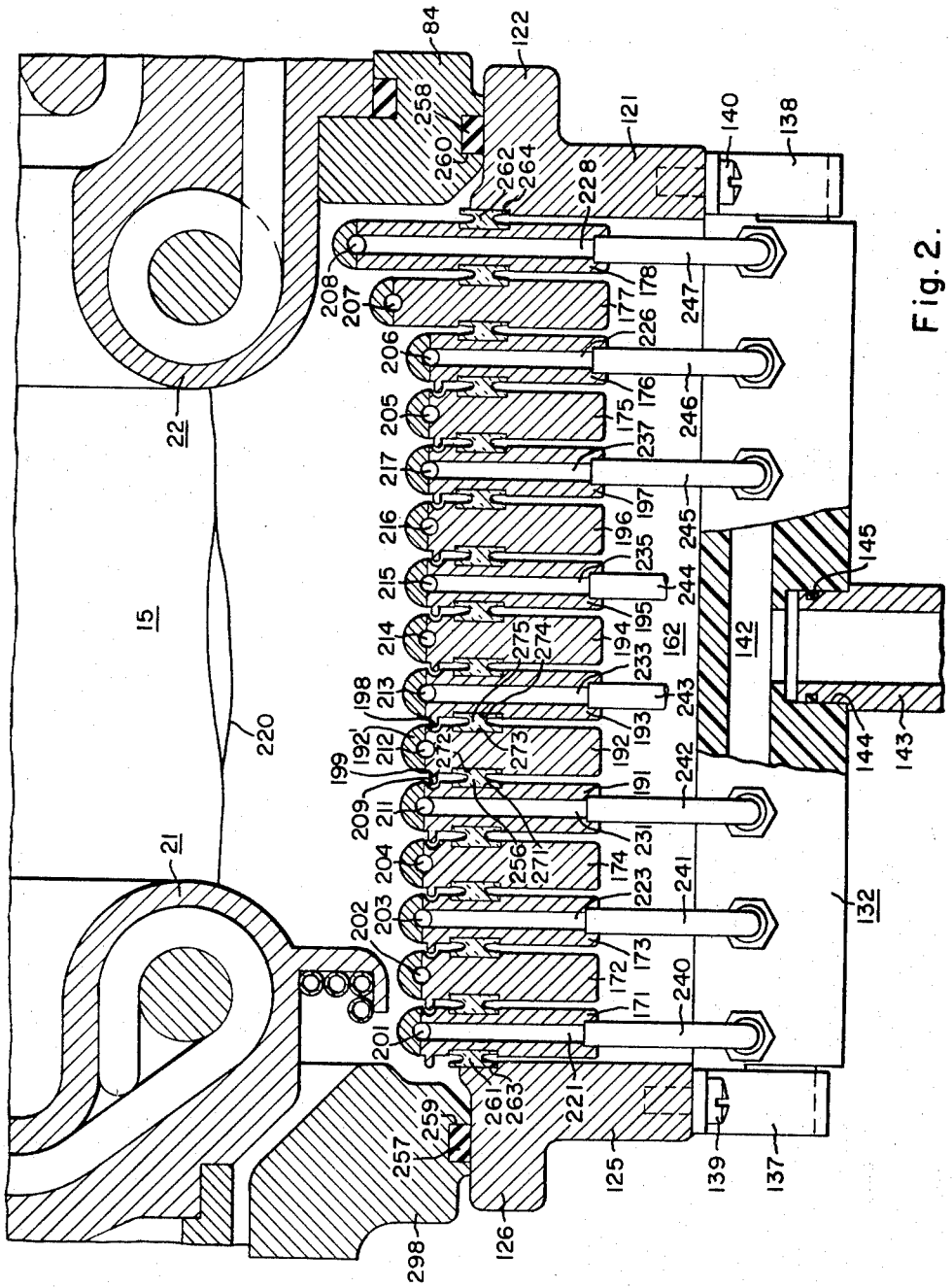

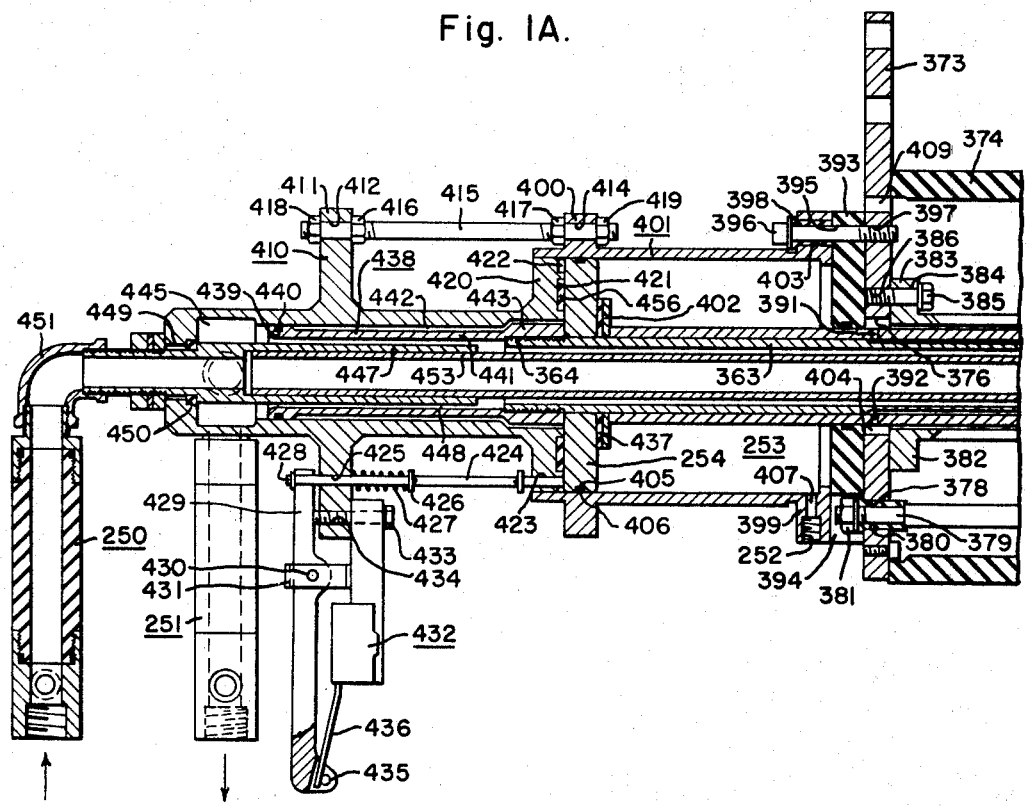
Fig. IA.

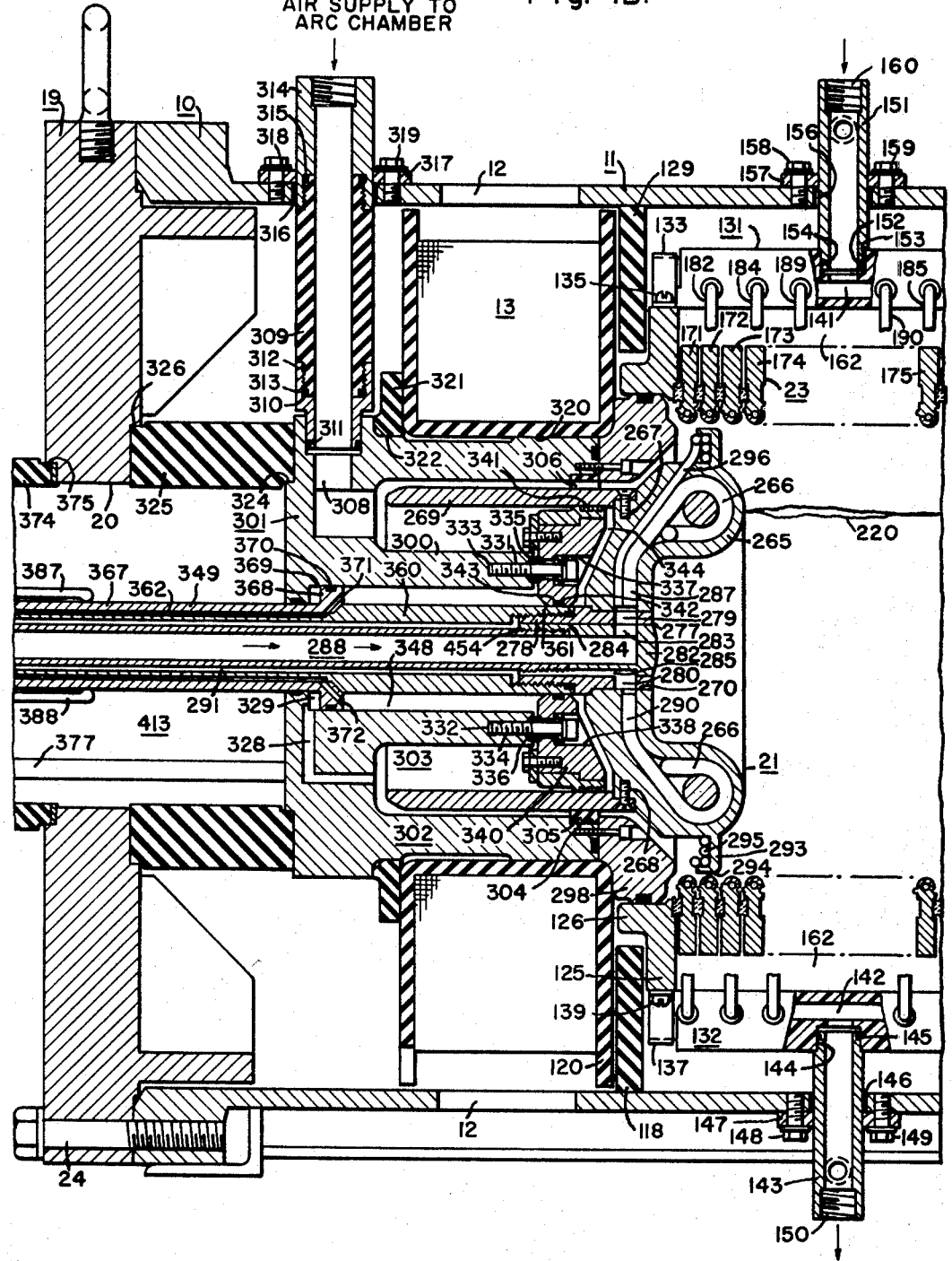

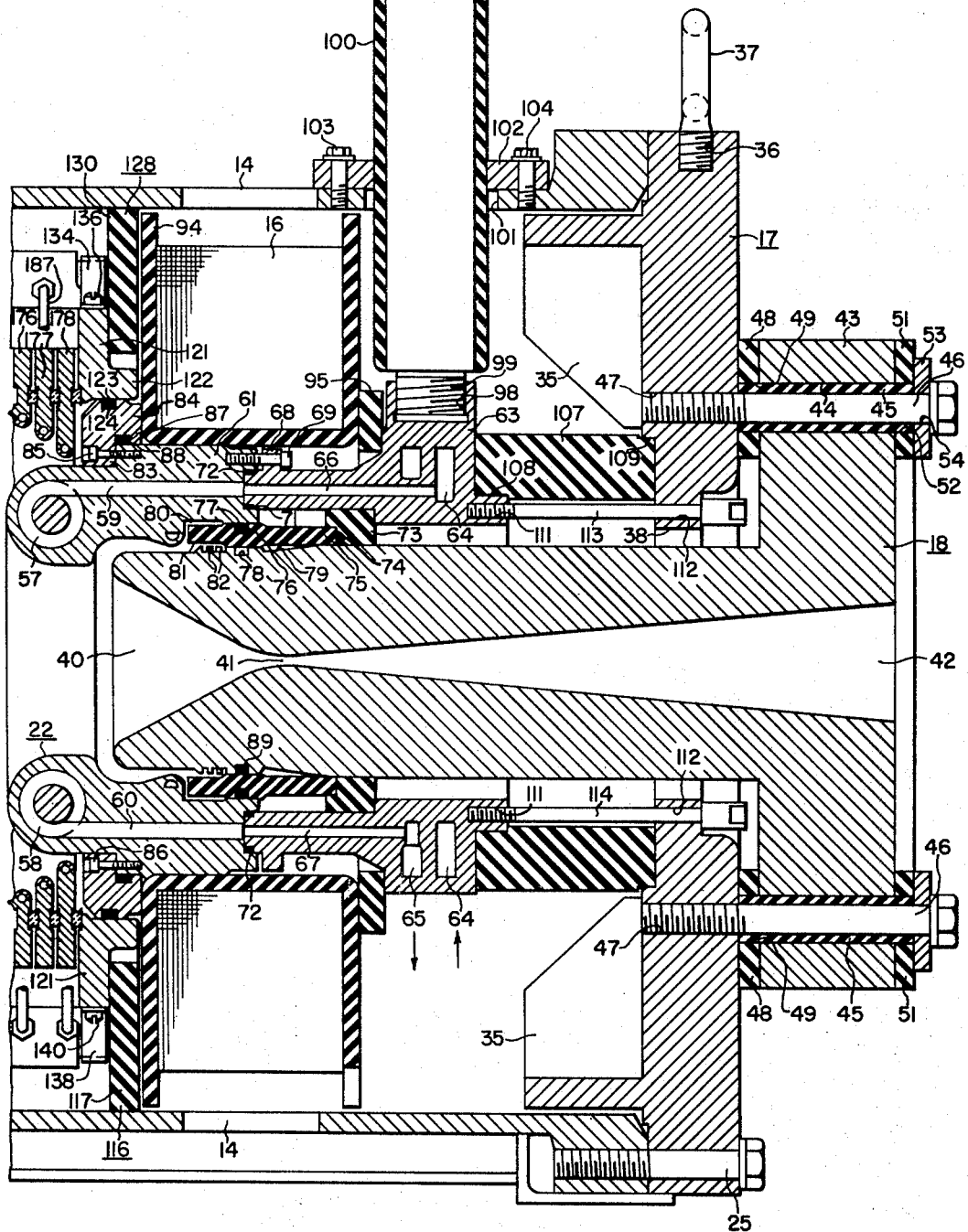

United States Patent Office 3,389,282
Patented June 18, 1968

3,389,282
ARC HEATER APPARATUS AND HEAT SHIELD ASSEMBLY FOR USE THEREIN
Thomas E. Browne, Jr., Forest Hills, and Charles B. Wolf, Irwin, Pa., assignors to Westinghouse Electric Corporation, Pittsburgh, Pa., a corporation of Pennsylvania
Filed Jan. 27, 1964, Ser. No. 340,221
16 Claims. (Cl. 313—19)

This invention relates to improvements in arc heaters, and more particularly to an improved arc heater having an improved heat shield forming the wall of the arc chamber.

This invention was made in the performance of a contract of the Natoinal Aeronautics and Space Administration, NASA–1350.

Arc heater apparatus, generally speaking, encounters two recurring and persistent problems. One of these is the cooling of the electrodes and the walls of the arc chamber, which may be raised to temperatures of thousands of degrees by convection and direct radiation from the arc. The other problem is in insulating the chamber and the electrodes properly so that the arc is confined to the desired path between electrodes, and does not strike over to the wall of the chamber, or to other unintended parts of the chamber structure.

The apparatus of our inveniton satisfactorily solves the problem of cooling an arc chamber insofar as the flow of water is adqeuate for cooling purposes, and permits the gas in the chamber to be heated to a temperature exceeding that possible in prior art arc chambers. This is accomplished by circulating water through the electrodes themselves, and by having the wall of the chamber formed of an assembled stack of metal rings and nonmetallic gaskets.

An arc chamber having a wall formed of a stack of metal rings and non-metallic gaskets is described and claimed in a copending application fo George A. Kemeny and Charles B .Wolf for "Arc Heater Apparatus," Ser. No. 241,639, filed Dec. 3, 1962, and continuation thereof Ser. No. 428,599, and assigned to the assignee of the instant invention. In that applicaiton, the rings are composed almost entirely of a magnetic material, and together with a yoke form part of a magnetic circuit for setting up a strong magnetic field between the electrodes. The invention described and claimed herein is related to the invention described and claimed in a copending application by A. M. Bruning et al. for "Water Cooled Arc Heater Apparatus and Heat Shield for Use Therein," Ser. No. 340,220, filed Jan. 27, 1964.

The metal rings of the instant invention, on the other hand, are made up of an inner ring of copper and an outer ring of stainless steel or other non-magnetic material for support. The copper inner ring has an internal annular passageway for the flow of water with inlet and outlet water passages through the outer ring spaced 180° from each other. Two non-metallic water headers provide for distributing cooling fluid to all of the rings simultaneously the water following a dual passage through each ring, each passage substantially encompassing 180 degrees, the water exiting through a water header on the opposite side of the chamber. The rings are insulated from each other by washers, there being one washer disposed between each adjacent pair of rings. Furthermore, each ring has a circular tongue extending around the entire ring on one side at substantially the circular position where the curved inner surface joins the flat side wall surface, and has a groove therein opposite the tongue on the other side of the ring, so that when the rings are assembled axially aligned as to their centers in the form of a heat shield, the tongue of one ring fits into the groove of the adjacent ring but without forming electrical connection thereto. This tongue and groove feature prevents direct radiation from the arc from reaching the insulating washers and elevating them to a temperature which would result in the destruction of their insulating and sealing properties. As previously stated, each of the cooling rings is insulated from the ring on each side thereof, so that all of the rings are electrically "floating," and this prevents accidental striking of the arc to the metallic ring elements and inhibits the formation of an electrical path through the ring elements. As will be readily understood by those skilled in the art, striking of the arc on, or formation of an arc path to the heat shield ring elements, if it occurred, could burn through the metal walls of the inner ring and release the cooling liquid which is flowing in the circular passageway therein.

Accordingly, a primary object of our invention is to provide an arc heater having improved performance over any arc heater now existing in the art.

A further object is to provide a new and improved arc heater having a stack of metal rings forming the cylindrical surface of the arc chamber, each of the rings including an inner copper portion and an outer portion of stainless steel or other non-magnetic material, the inner copper portion having an annular groove therein for the flow of a cooling fluid.

Another object of our invention is to provide an arc heater in which striking of the arc to the chamber walls is inhibited by forming the chamber walls of a plurality of stacked axially aligned rings each of which is insulated from the rings on the adjoining sides thereof, and in which the voltage imposed across the stack of heat shield rings is divided equally among the spaces between the rings by means of the high resistance water path making electrical connection to the rings.

A further object is to provide a new and improved arc heater having improved cooling of the chamber walls and having an electrode and chamber wall arrangement which reduces to a minimum the possibility of the arc striking to the chamber wall.

These and other objects will become more clearly apparent after a study of the following specification, when taken in connection with the accompanying drawings, in which:

FIGURES 1A, 1B and 1C taken together show a cross-sectional view through apparatus embodying our arc heater invention; and FIG. 2 is a partial section showing in enlarged view a portion of the arc chamber wall and the rings forming the same.

Referring now to the drawings, in which like reference characters are used throughout to designate like parts, and in particular to FIG. 1 thereof, the apparatus is seen to include, in broad outline, a tank assembly generally designated 10 having a cylindrical wall portion 11 with spaced openings 12 around the periphery thereof at selected positions therein on one side of the arc chamber to provide for ventilation of a field coil 13 adjacent thereto, and tank 10 has an additional series of spaced apertures 14 on the other side of the arc chamber 15 for ventilating field coil 16 disposed adjacent thereto. The tank assembly includes a generally annular end cover 17 for the front or downstream end of the chamber, that is, the nozzle end, the cover 17 having disposed therein a nozzle generally designated 18 which is electrically insulated therefrom in a manner and for purposes hereinafter to be made more clearly apparent. At the other or rear end of the tank assembly there is a somewhat similar cover plate 19 having aperture 20 therein through which passes the supporting structure of a movable rear electrode generally designated 21, the electrode 21 being adapted to be moved to the right, FIG. 1, until it makes contact with the front electrode it makes contact with the front electrode generally designated 22, for the purpose of starting the arc. Thereafter the rear electrode 21 is returned to the position shown in the drawing by means hereinafter to be described.

The wall of the arc chamber is made up of a series of stacked metallic rings separated from each other by washers so that the rings are electrically insulated from each other, the stacked ring assembly being generally designated 23. In a manner hereinafter to be described in greater detail, each of the rings comprising the ring assembly 23 is water cooled by circulating water in circular passageway therein.

At the rear end a plurality of spaced bolts 24 around the periphery of cover 19 clamp the cover 19 to the flange portion of cylindrical wall or tank 11, and at the front end a plurality of bolts 25 at spaced intervals around the periphery of front cover 17 clamp the front cover to an adjacent flange portion of the cylindrical wall or tank 11.

In more detail, the front end cover plate 17 has a series of spaced radially extending flanges at spaced intervals around the periphery thereof on the inside surface thereof to provide mechanical reinforcement of the cover plate, these flanges being designated 35. On the upper side of the cover plate 17 as seen in FIG. 1, there is a threaded bore 36 in which is disposed an eye or ring 37 to assist in mounting or lifting of the structure. The front cover 17 has a substantially circular aperture 38 therein through which passes, but spaced therefrom, the aforementioned nozzle 18. The nozzle 18 has the inner passageway portion 40 tapering to form the throat 41 from which point the nozzle passageway generally increases in diameter in the flaring portion 42. The nozzle terminates at its outer portion in a flange portion 43 formed integrally with the inner portion, the flange portion 43 having a plurality of spaced bores 44 therethrough, each of which has a sleeve of insulating material 45 disposed therein through which passes a bolt 46 having the end in threaded engagement in an aligned threaded bore 47 in the cover plate 17. The flange 43 is spaced from and insulated from the cover 17 by an annular ring 48 composed of insulating material, the annular insulating ring 48 having a plurality of bores 49 therein at spaced intervals therearound for the passage of the aforementioned insulating sleeves 45. On the outside of the aforementioned flange 43 there is an additional annular insulating ring 51 having spaced bores 52 therein for the passage of the aforementioned insulating sleeve 45. An additional annular ring 53 composed of metallic material is provided adjacent the insulating ring 51, the annular ring 53 having bores 54 therein of the diameter of the bolt 46 for the passage of the bolts therethrough. The rings 48 and 51 with the sleeves 45 completely insulate the outer flange portion of the nozzle 18 from the end plate 17 while the metallic rings 53 assist the bolts 46 in firmly clamping the flange 43 to the cover 17.

The front or downstream electrode generally designated 22 is preferably composed of a high heat conductivity material such as copper, and has a spiral passageway or spiral passageways extending therearound for the passage of water for cooling the electrode. Two of these passageways are shown at 57 and 58, and it is seen that these spiral passageways have conduit portions 59 and 60 extending through the cylindrical body of the electrode in a direction substantially parallel to the longitudinal axis thereof, the cylindrical body portion being designated 61. The electrode 22 including the body portion 61 may be entirely made of copper to facilitate the transfer of heat energy from the arc chamber. Adjacent the electrode body portion 61 and forming part of the downstream electrode assembly is a front electrode manifold assembly generally designated 63. This manifold assembly is composed of metal and forms part of the electrical circuit to the electrode 22, in a manner which will become more clearly apparent hereinafter. The manifold 63 is seen to have two annular passageways 64 and 65 extending therearound, passageway 64 being a water inlet passageway for example and passageway 65 being a water outlet passageway. It will be understood that these two passageways, which are manifolds, communicate at convenient locations, not shown, with water input and water output couplings, such as hoses, disposed at convenient positions around the outside of the casing generally designated 11. The circular or annular passageway 64 has a plurality of conduits 66 extending therefrom in alignment with the aforementioned conduits 59 in the cylindrical copper portion 61 of the electrode assembly, so that water flows from the manifold passageway 64 through conduits 66 and 59 into the spiral cooling conduit portion 57.

The heated water from spiral passageway 58 travels down the exit conduit 60, which is in alignment with a conduit portion 67 communicating with the outlet annular passageway 65 of the manifold assembly 63. As will be readily understood, a plurality of inlet conduits 66 at spaced intervals around the periphery of the manifold 63 are provided and a plurality of outlet conduits 67 at spaced intervals around the periphery of the manifold 63 are provided, so that a substantial quantity of water is forced through the electrode 22 in a very brief interval of time. The manifold 63 is shown to have an annular flange 68 extending therearound near the copper electrode portion 61, and to have bolts 69 at spaced intervals around the flange 68 making threaded engagement with aligned threaded bores in the cylindrical wall portion 61 of the electrode to firmly attach the manifold 63 to the electrode 22. Annular O-ring seals 71 and 72 are provided at the annular interface of electrode 22 and water manifold 63. Metallic contact of these interfaces prevent or minimize flow of cooling liquid between the inlet and outlet passages at this interface.

The manifold 63 is spaced from the aforementioned nozzle 18 by an annular ring 73 which is composed of both heat insulating and electrically insulating material of a suitable choice. The ring 73 is shown to have an annular cutaway groove portion 74 in which is disposed one end of a ring-like or cylindrical member 75 composed of insulating material, which extends from the ring 73 toward the arc chamber 15 and spaces the adjacent portion of the nozzle 18 from the cylindrical portion 61 of the electrode 22 while electrically insulating the electrode from the nozzle. The ring 75 is seen to have an annular groove 76 therearound for O-ring 77 to form sealing engagement with the inner wall of the electrode portion 61. The nozzle 18 is seen to have an annular groove 78 therearound for containing the O-ring 89, and the nozzle 18 is also seen to have a slightly tapered cutaway annular portion 79 extending therearound to provide a space between the wall of the nozzle 18 and the adjacent wall of ring member 75. It is seen that at the left-hand end of the insulating ring 75, as seen in FIG. 1C, an annular space 80 is provided between member 75 and the inner wall of cylindrical electrode portion 61, and an annular space 81 is provided between the inner wall of ring member 75 and the adjacent wall of nozzle 18. This wall portion of nozzle 18 is seen to have annular ridges 82 at spaced intervals therealong. If desired, cold air may be introduced into these annular spaces, the air flowing out between the inner wall of the electrode 61 and the adjacent wall of the nozzle 18, and thence flowing into area 40 and thence out of the exhaust end of the nozzle. The flow of air through the aforedescribed channel will keep hot gases from coming in contact with insulator 75 and additionally assist in cooling the nozzle.

The left hand end of cylindrical electrode portion 61 is seen, FIG. 1, to have a portion thereof forming a shoulder 83 upon which is mounted an annular ring 84, the ring 84 being held in position by a plurality of spaced bolts at intervals around the periphery thereof, two of these bolts being shown at 85 and 86. An O-ring seal 87 in an annular groove 88 provides for a good seal between the ring 84 and the electrode portion 61. The ring 84 is provided as one portion of the support for a stacked plurality of metal rings and gaskets which together form the wall of the arc chamber in a manner hereinbefore set forth. This stack of rings and gaskets is generally designated 23.

Disposed adjacent the electrode portion 61 and the manifold 63 and external thereto is a large field coil 16 enclosed within a housing 94 composed of insulating material. One side of the housing 94 is seen to firmly abut against one side wall of the aforementioned ring 84, whereas the other side of the housing 94 abuts against an annular ring 95 composed of insulating material which spaces the housing 94 from the manifold 63.

The manifold 63 is seen to have a threaded aperture 98 therein at a convenient position, in which is disposed in threaded engagement the threaded end of a power cable connection 99. The cable 99 has an electrical bushing 100 therefor passing through an aperture 101 in the wall 11 of the tank portion, and the bushing 100 is retained in position by the collar 102 having bolts at spaced intervals around the periphery thereof, two of these bolts being shown at 103 and 104 in threaded engagement with aligned threaded bores in the wall of the tank.

The aforementioned manifold 63 is shown to be firmly secured to and spaced from the end cover 17 by a substantial ring member 107 composed of insulating material. The ring member 107 fits snugly in a shoulder 108 formed in the manifold 63, and fits snugly in a shoulder 109 formed in the inner surface of the cover plate 17. The generally cylindrical manifold 63 has a plurality of bores 111 at spaced intervals around the periphery thereof near the inner wall thereof, these bores 111 being in alignment with a plurality of bores 112 at spaced intervals around the periphery of the aforementioned opening 38 in the cover 17. Through these apertures pass a plurality of bolts composed of insulating material or otherwise insulated, two of these bolts being shown at 113 and 114, and which have the threaded ends thereof in threaded engagement in the threaded bores 111.

Means, not shown for convenience of illustration, is provided for bringing an energizing potential to the field coil 16, which if desired is so wound or has the polarity of the potential applied thereto so chosen that the magnetic field of coil 16 opposes the magnetic field of the aforementioned field coil 13 with the result that in the arc chamber a magnetic field substantially transverse to the arc path is provided, for reasons which will become hereinafter more clearly apparent.

The field coil 13 may be connected in series or in parallel with coil 16 internally of the tank 11 for excitation, or if desired the field coil 13 may have separate leads to the outside of the tank and the desired connections made externally.

As previously stated, one of the more important features of apparatus embodying our invention is that the wall of the arc chamber consists of a plurality of stacked annular rings insulated from each other, the rings having a copper portion forming the inside thereof and a stainless steel or non-magnetic metal portion forming the outside thereof. In the copper portion an annular passageway provides for the flow of a coolant such for example as water to assist in cooling the walls of the chamber. This annular passageway may be entirely in the copper portion, or may be at the border surface between the two portions, and in fact a portion of the passageway may be cut out of the stainless steel or non-magnetic metal portion. In addition, the rings, which are all substantially floating with respect to each other except for the connection through the high resistivity cooling fluid, are insulated from each other so as to inhibit the arc striking to the coolant rings and forming a low resistance electrical path therethrough.

Generally speaking, the cooling ring and gasket assembly and water headers generally designated 131 and 132 are cradled in a pair of saddles which are generally designated 128 and 116 and which includes plates 117, 118, 129 and 130, which are composed of insulating material and bolted to the tank wall 11, one saddle portion 117 abutting against the outer wall of the housing 94 for field coil 16, and another saddle portion 118 abutting against the housing 120 for field coil 13. Saddle portions 129 and 130 of saddle 128 for water header 131 likewise abut against housings 120 and 94.

As previously stated, the inner end of the electrode 22 has an annular ring 84 secured thereto, and abutting against the outer surface of this annular ring 84 is the flanged portion 122 of a ring-like supporting member 121; the flange portion 122 is sealed by O-ring 123, the O-ring 123 being disposed in annular groove 124 in ring 84.

On the other side of the ring and gasket assembly, there is a similar ring 125 with a flange portion 126. These rings 121 and 125 assist in supporting at substantially diametric positions, or positions 180 degrees apart, the aforementioned pair of water headers generally designated 131 and 132. The water header 131 has extended end or extended side portions 133 and 134 which are secured as by screws 135 and 136 to the rings 125 and 121 respectively. The oppositely disposed water header generally designated 132 has extended side portions 137 and 138 held as by screws 139 and 140 to the rings 125 and 121 respectively.

The aforementioned water header 131 is composed of insulating material, as is the other water header, and may constitute the inlet water header, and has the chamber 141 thereof connected to a hydraulic insulator 151 composed partially of electrically insulating material. The inner end 152 of the hydraulic insulator 151 is seated in a bore 153 in the wall of the water header 131 and has an O-ring 154 for providing a good seal. The hydraulic insulator 151 passes through a bore 156 in the wall portion or cylindrical tank portion 11, and the hydraulic insulator 151 is held in place therein by a collar 157 having spaced bolts around the periphery thereof, two of these bolts being shown at 158 and 159 in threaded engagement with aligned threaded bores in the wall portion 11. The upper end of the heat shield hydraulic insulator 151 is seen to be threaded at 160 to receive a coupling to, for example, a flexible hose for bringing water to the input water header 131. In the space 162 between the water header 131 and the adjacent outer surfaces of the rings forming the heat shield is a series of insulated bolts (not shown) which join supporting rings 121 and 125 for the purpose of holding the heat shield together as a unit and compressing the sealing gaskets between the heat shield rings.

As previously stated, each of the rings of the ring assembly generally designated 23 has a circular passageway therethrough with inlet and outlet passageways disposed 180 degrees apart for bringing cooling liquid to the inner circular passageway and exiting the fluid from the passageway. The stacked ring heat shield assembly generally designated 23 is seen, in FIG. 1, to include rings 171, 172, 173, 174, 175, 176, 177 and 178, there being room for seven additional rings between ring 174 and ring 175, these seven additional rings being of the same diameter as rings 174 and 175 but not being shown in FIG. 1 for clarity and simplicity of illustration. The additional rings are shown in FIG. 2 and are designated 191, 192, 193, 194, 195, 196 and 197. The water inlet 131 is seen in FIG. 1 to have a plurality of conduits extending from the side thereof, these conduits being designated 182, 184, 189, 190, 185 and 187. Conduit 182 is connected to ring 172 to bring water thereto, conduit 184 is connected to ring 174, conduit 185 is connected to ring 175, and conduit 187 is connected to ring 177. It is understood that on the other side of the inlet water header 131, and not visible in FIG. 1, there is an additional group of conduits, corresponding to those shown, for bringing cooling water to ring 171, ring 173, ring 176, and ring 178. It is noted that rings 177 and 178 are of reduced inner diameter to reduce the space between the inner side of the heat shield and adjacent portions of the electrode 22. This reduced inner diameter of rings 177 and 178 assists in preventing direct radiation from the arc from reaching the ring member 121 and ring member 84, direct radiation causing the heating and possible destruction of these elements.

The aforementioned outlet water header 132 is seen to have a chamber 142, to have a hydraulic insulator 143 firmly seated in a bore 144 with an O-ring seal 145. The hydraulic insulator 143 passes through an aperture 146 in the wall portion 11 and is held in place by a collar 147 having bolts at spaced intervals around the periphery thereof, two of these bolts being shown at 148 and 149 in threaded engagement with adjacent threaded bores in the wall portion 11. The heat shield hydraulic insulator member 143 has a threaded outer end 150 for making threaded engagement with a coupling hose.

Particular reference is made now to FIG. 2, which shows an enlarged view of the water header 132 and the stacked rings which form the heat shield in the arc chamber. In FIG. 2, the seven additional rings 191 to 197 inclusive are shown. The water header 132 is seen to have conduits communicating with the rings in a manner to be described in greater detail hereinafter. Rings 171 to 174 are seen to have circular passageways 201 to 204 respectively; rings 191 to 197 inclusive are seen to have circular passageways 211 to 217 inclusive respectively; and rings 175 to 178 inclusive are seen to have circular passageways 205 to 208 inclusive. Ring 171 has an output passageway 221; ring 173 has an output passageway 223; ring 191 has an output passageway 231; ring 193 has an output passageway 233; ring 195 has an output passageway 235; ring 197 has an output passageway 237; ring 176 has an output passageway 226; and ring 178 has an output passageway 228; conduits 240 to 147 inclusive extending from the side wall of the exit water header 132 connect with passageways 221, 223, 231, 233, 235, 237, 226, and 228, respectively in the rings. It will be understood that seven additional conduits, not shown, extend from the other side of the water header 132 and connect with passageways in the other rings, these passageways being disposed at a slight angle to the passageways in the rings shown in FIG. 2. As previously stated, each of the rings consists of an outer portion of stainless steel or non-magnetic metal and an inner portion of a material which is highly conductive of heat, for example, copper. The copper portion 192' of ring 192 is seen to extend substantially 180° around the circular passageway 212 and to comprise substantially all of the portion of the ring which is exposed to direct radiation from the arc 220 between the electrodes 21 and 22. All of the other rings have a copper inner portion similar to the portion 192' which is selected for illustration only. Each of the rings has an annular groove extending therearound, the groove of ring 192 being designated 198, and on the opposite side of the ring 192 is an annular tongue 199 extending entirely around the ring. The tongue 199 of ring 192 extends into but does not touch the surface of an aligned groove 209 in the adjacent ring 191. As previously stated, each ring is electrically insulated from the adjacent rings on both sides thereof. The purpose of the tongue 199 extending into the groove 209 is to shield a spacer washer from direct radiation from the arc 220. The spacer washer between rings 191 and 192 is designated 256 and is disposed in aligned adjacent grooves 271 and 272 in rings 191 and 192 respectively. The spacer washer, which is circular or annular in shape, spaces the rings 191 and 192 from each other while insulating the rings electrically from each other. The spacer washer 256 is composed of a material which is both electrically insulating and preferably heat resistant also. It is seen that on the other side of the ring 192 there is a groove 273, the annular groove 273 extending all around the wall of the ring, the groove 273 being adjacent a groove 274 in ring 193. Spacer washer 275 is disposed in the aforementioned grooves 273 and 274 in adjacent walls of rings 192 and 193 respectively. In all it is seen that in FIG. 2, sixteen spacer washers are provided, fourteen of these washers being disposed between the fifteen rings for insulating and pneumatically sealing the space between the rings, and two additional outer washers 261 and 262 snugly resting in shoulders 263 and 264 in the aforementioned ring support members 125 and 121 respectively. As previously stated, there is a space 162 between the inner wall of the water header 132 and the adjacent cylindrical outer surfaces of the ring members. The ring members are retained in place in the stack by the pressure of insulated bolts which join members 125 and 121, pressure against the washers 261 and 262 being exerted through the entire stack of rings. To assist in maintaining the rings in position, the diameter of rings 298 and 84 is made such that sealing between 298 and 125, and sealing between 84 and 121, occurs at a circular position which is slightly larger in diameter than the mean diameter of gaskets 261 and 262; pressure on the rings exerted by gas in the chamber 15 tends to tighten the seal at 261 and 262. O-rings 257 and 258 in annular grooves 259 and 260 are provided, as shown.

Water flows through the aforementioned inlet hydraulic insulator 151 into the chamber 141 of the input water header 131, whence it passes by way of conduits to the various rings, some of these conduits being shown at 182, 184, 189, 190, 185 and 187, FIG. 1. The water then passes into the circular passageways in each of the rings, and around the dual semi-circular paths in passageways 201 to 204 inclusive, around the dual paths in passageways 211 to 217 inclusive, and around the dual paths in passageways 205 to 208 inclusive, FIG. 2, the water exiting from the rings through the exit conduit portions 221, 223, 231, 233, 235, 237, 226 and 228, and thence through conduits 240, 241, 242, 243, 244, 245, 246 and 247 into the chamber 142 of the exit water header generally designated 132, and thence out through the water header hydraulic insulator 143. The copper portions of the ring members provide for the efficient conduction of the heat transmitted thereto by convection and direct radiation to the water and result in an efficiently cooled arc chamber. As previously stated, each of the rings is electrically insulated from the other rings on both sides thereof and this inhibits the arc 220 from inadvertently striking to the rings and forming an electrical passageway between electrodes 21 and 22 at least partially through the rings.

As previously stated, the subdivision of the heat shield into a multiplicity of electrically "floating" elements to prevent accidental striking of the arc to the metallic elements is an important feature of our invention. Striking of the arc or formation of arc terminals on the shield elements could form heat spots cutting or melting through the metal walls, and releasing the cooling liquid. This is prevented by limiting the electrical potential difference between adjacent elements to a low value, preferably less than 100 volts when maximum arc voltage exists between the terminal electrodes 21 and 22. This is additionally insured by the "potentiometer effect" of the uniform water passages, which form the only electrical connection between the individual rings and the arc terminals. This effect is by virtue of the low but finite conductivity of the cooling water even when it is relatively pure. The number of elements or rings is made greater than the maximum arc voltage divided by a value of the order of 100 volts.

The aforementioned movable electrode generally designated 21 may be called herein the starter electrode since electrode 21 moves to electrode 22 and makes contact therewith for starting the arc. Thereafter electrode 21 is moved away from electrode 22. The moving electrode has a hydraulic insulator generally designated 250 for the fluid input terminal thereof, and a hydraulic insulator generally designated 251 for the exit of cooling water from the cooling circuit. As will be seen hereinafter, the pressure of the water at inlet 250 is sufficient to force the electrode 21 to the right until it makes contact with electrode 22. To restore the electrode 21 to the operative position shown, air is inserted through an opening 252 and passageway 407 into a chamber 253 where it exerts pressure against a piston 254, forcing the piston to the left, FIG. 1, and carrying with it the electrode 21, in a manner which will be described in more detail hereinafter. The aforementioned movable electrode generally designated 21 has a dish shaped portion 265 composed of copper or other material having a high heat conductivity, with a spiral passageway 266 extending therearound. The dish portion or electrode portion 265 has mounted thereon and secured thereto by a plurality of screws, two of these screws being shown at 267 and 268, a generally cylindrical back portion 269. The dish portion 265 has a circular bore or aperture 270 substantially centrally disposed therein which is disposed one end of a coupling member or bushing 277 having a threaded portion 278 at the other end thereof, having a passageway 279 through the wall thereof at a predetermined position on one side thereof and having an additional passageway 280 on the other side thereof, the passageways 279 and 280 not communicating with each other. Inside the bushing 277 and snugly fitting therein is an additional coupling member 282 having an aperture 283 in one side thereof in alignment in the aforementioned aperture 279 in bushing 277 when the coupling member 282 is in position in the bushing. The coupling member 282 is seen to have at the other end thereof a portion of slightly increased inner diameter with threads on the inner surface thereof, this portion being designated 284. The other side of the coupling member 282 opposite to the opening 283 is asymmetrical with respect to the first-named side and has the outer diameter thereof considerably reduced to form a space 285 between the outer wall of member 282 and the inner adjacent wall of member 277, this space 285 extending, for example, one-half way around the bushing 277 and including the portion of the coupling member 282 which is adjacent to the aforementioned opening 280 in the bushing 277. The space 285 communicates with an annular space 291 and provides part of the entire passageway for the flow of water from the spiral conduit of the electrode portion 265 to outlet hydraulic insulator 251. It is seen that the main electrode portion 265 has an inlet conduit portion 287 connecting the spiral portion 266 of the cooling passageway to the aperture 279. Cooling water entering through the aforementioned hydraulic coupling member 250 flows down the long central passageway 288, to be described in further detail later, and it is seen that the passageway 288 communicates through the aforementioned openings 283 and 279 with the conduit portion 287. Cooling water flowing through the opening 283 in coupling member 282 flows through the opening 279 in bushing 277 and thence into the conduit portion 287 which may be formed integrally with the spiral cooling passageway 266. The water flowing into the conduit 287 may divide and flow in two directions through two portions of the spiral conduit 266, each portion covering substantially 180 degrees of the electrode. Water exits from the spiral cooling tube 266 by way of a conduit 290 which has the end thereof closely adjacent the aforementioned opening 280 in the bushing 277. Thence water flows through the space 285 formed by the asymmetrical portion of reduced outer diameter of the coupling member 282 into the aforementioned exit passageway 291 which will be described in greater detail hereinafter. The electrode portion 265 is seen to have an outwardly extending annular flange portion 293 also composed of copper or other heat conductive material, the annular flange portion 293 having a backwardly flaring lip portion 294. Back of the flange portion 293 and supported by the lip portion 294 is a circular "pancake" cooling coil 295 of somewhat smaller diameter than the passageway 266. The upper end of the cooling coil 295 is seen to communicate by conduit portion 296 with the openings 279 and 284; the lower end of the cooling coil 295 also communicates with the opening 280, this communicating portion of the coil 295 not being shown for convenience of illustration, but it will be understood that water entering the cooling coil 295 through the conduit portion 296 exits through the opening 280 into the passageway or space 285 and thence into the exit passageway 291. The flange portion 293 is provided to prevent direct radiation from the arc between electrodes 21 and 22 from reaching the aforementioned rear sealing ring 293. The structure and purpose of the sealing ring 298 will be described in greater detail hereinafter, but it may be stated here that it is desirable to prevent direct radiation from reaching this ring to prevent burning of the metal and possible destruction of the ring.

The aforementioned electrode 21 with its backwardly extending cylindrical portion 269 is mounted for a translational movement with respect to an axially extending cylindrical portion 300 of a rear chamber forming means generally designated 301. Chamber forming means 301, in addition to the axially extending cylindrical portion 300, also has an outer cylindrical portion 302; the rear chamber forming means 301 is composed of metal and is electrically insulated from the tank 11 and end covers in a manner to become clear hereinafter. The space between the cylindrical portion 300 and the cylindrical portion 302 is designated 303, and provides room for the movement of the piston portion 269. It is seen that this space or cutaway portion 303 is generally tubular in shape, forming a relatively tubular chamber. The portion 302 has an annular groove 304 extending therearound on the inside thereof at the right-hand end, FIG. 1. In the groove 304 there is disposed a ring or annular washer 305 of insulating material, which spaces the cylindrical electrode portion 269 from the adjacent wall of the portion 302 while permitting relative movemnt between the portion 302 and electrode portion 269. The ring or annular washer 305 has a plurality of cutaway portions at spaced intervals around the inner surface thereof, one of these cutaway portions being shown at 306. The spaces formed by the cutaway portions 306 uniformly admti the high pressure air to arc chamber 15, substantially equalizing the pressure between the front of the electrode 21 and the rear of the electrode. It is seen that the spaces 306 formed by the cutaway portions of washer 305 also communicates with a large passageway or conduit 308, which communicates with the bore through an air inlet device generally designated 309. The air inlet device 309 is composed of three sections, a first section 310 composed of metal or other material and having the bore therethrough communicating with the adjacent opening of the conduit 308 and having an O-ring seal 311 for providing sealing engagement with the adjacent wall portion of the rear chamber forming means 301. In threaded engagement with section 310 is a section 312 composed of electrically insulating material and having the O-ring 313 for providing a close sealing engagement between the sections. The third section 314 of the air inlet device 309 is composed of metal, if desired, is in threaded engagement with the center section 312 and has O-ring 315 for providing a close seal. Section 314 passes through an aperture 316 in the wall 11, and the air inlet device 309 is held in place in the aperture by collar 317 therearound, the collar 317 having bolts at spaced intervals therearound, two of these bolts being shown at 318 and 319 in threaded engagement with aligned threaded bores in the wall 11. It is seen that a portion 320 of the outside wall of cylindrical portion 302 assists in supporting the housing 120 of field coil 13, and that additional support is provided by a ring member 321 seated in a groove 322 and abutting against the housing 120. The rear chamber forming means generally designated 301 also has an annular shoulder 324 extending therearound in which is seated a cylindrical ring 325 of electrically insulating material having the other end thereof in an annular shoulder 326 in the tank end 19. The member 325, composed of electrically insulating material, firmly supports the rear chamber forming means while insulating it from the rear tank cover 19.

Oppositely disposed from the conduit 308 is a small passageway 328 communicating between the aforementioned space 303 back of the electrode 21, and an annular space 329 to assist in equalizing the pressure at 303 and 329.

As previously stated, the electrodes including the electrode generally designated 21 are insulated from the tank which contains the apparatus. It is necessary to insulate the electrode structure from the supporting cylindrical structure 300 even though electrode 21 and cylindrical structure 300 are at the same potential, to prevent the formation of parallel current paths which might cause sparking at 343 or at 341. To this end, a plurality of screws at spaced intervals in a circular pattern, two of these screws being shown at 331 and 332, have their threaded ends in threaded engagement with threaded bores 333 and 334 at spaced intervals around the axially extending cylindrical portion 300, pass through insulating bushings 335 and 336 and have their heads located in bores 337 and 338 which are considerably greater in diameter than the heads of the aforementioned bolts 331 and 332, and which provides for countersinking the heads of the bolts so that no electrical contact is made between the member 300 and the rear portion 340 of the electrode structure. It is seen that this rear portion 340 has annular grooves 341 extending therearound for limiting the flow of gas through this sliding joint as the cylinder portion 269 moves with respect thereto, and on the inside the rear portion 340 has an O-ring 342 in annular groove 343 for providing sealing engagement with the adjacent outer wall of a sleeve 360 as the electrode assembly including the sleeve moves with respect thereto.

In threaded engagement with the aforementioned threads 278 of the bushing member 277, there is the adjacent threaded end 361 of the long sleeve 360, the sleeve 360 having a portion of reduced outer diameter 362, and having at the other end a portion of increased outer diameter 363 with a threaded end 364. On the outside of the sleeve 360 and snugly engaging the same over a portion of its length, there is an outer sleeve 367 which has a flange portion 368 on the right-hand end thereof, FIG. 1B, the flange having an annular groove 369 therein in which is disposed an O-ring seal 370 for providing sealing engagement with the adjacent wall of cylindrical portion 300. Flange 368 has a tapered inner wall, as shown, against which snugly fits a tapered outer surface of sleeve 360. Spaced bores around the periphery of flange 368, two of these being shown at 371 and 372 communicate between annular space 348 and annular space 349 formed between sleeve 367 and sleeve portion of reduced diameter 362. The annular space 349 communicates at the other end with spaced holes 391 and 392. Holes 391 and 392 communicate with annular passageway 404, and also communicate by the spaces between contact fingers including 387 and 388 to chamber 413, thence by bores 409 to atmosphere.

Electrical current is supplied to the movable electrode 21 by way of an electrical terminal plate 373 composed of metal or other suitable material; the plate 373 is spaced from the tank end 19 by a cylindrical spacer member 374 having the right-hand end seated in a groove 375 in member 19. The electrical terminal plate 373 is firmly secured to the rear chamber forming means generally designated 301 by a plurality of elongated bolts passing through a plurality of bores at spaced intervals around a central bore or aperture 376. One of these elongated bolts is shown at 377 passing through a bore 378 in the electrical terminal plate member 373 and having a portion of reduced diameter 379 with an insulating sleeve or insulating flanged bushing 380 there around and having the threaded end of the bolt in threaded engagement with a nut 381. The right-hand end of the bolt 377 may be threaded and is attached by threaded engagement to the rear chamber forming means 301. Accordingly, the electrical contact member 373 is insulated from bolts 377 and chamber forming means 301 by the insulating bushings or insulating sleeves 380. Secured to the electrical terminal plate 373 is a contact member 382 having a flange portion 383 having a plurality of bores 384 at spaced intervals therearound and having bolts 385 passing through the bores with their threaded ends in engagement with aligned threaded bores 386 for securing the contact member 382 to the terminal plate 373. The contact member 382 includes a plurality of circumferentially spaced contact fingers, two of these being shown at 387 and 388.

Secured to the aforementioned electrical contact plate 373 is an insulating plate 393 having a plurality of slots 394 around the periphery thereof for receiving the aforementioned nuts 381 attached to the aforementioned bolts 377. The insulating plate 393 has a plurality of bores 395 at spaced intervals around the periphery thereof through which pass bolts 396 having their threaded ends in threaded engagement in adjacent bores 397 in the electrical contact plate 373. It is seen that the bolt 396 has the left-hand end thereof, FIG. 1, surrounded by a sleeve or a flanged bushing of insulating material 398. Mounted around a portion of the sleeve 363 and having a flange portion 399 at the right-hand end thereof and a flange portion 400 at the left-hand end thereof is a cylinder generally designated 401, in which is disposed a movable piston 254 as aforementioned, the piston 254 abutting against an insulating washer 437 between it and a flange portion 402 on the left-hand end of the sleeve 367. The flange portion 399 at the right-hand end of the cylinder 401 is seen to abut against the aforementioned insulating plate 393, and the flange 399 has a plurality of bores at spaced intervals around the periphery thereof, one of these bores being shown at 403, in which are located the aforementioned insulating bushings or sleeves 398 and the aforementioned bolts 396 for securing the flange 399 and the integral cylinder 401 to the insulating plate 393 and to the electrical contact member 373, while maintaining electrical insulation between the cylinder 401 and terminal member 373. Piston 254 is seen to have an annular groove 405 with an O-ring 406. In the aforementioned flange 399, there is a passageway or conduit 407 connected with the threaded conduit end 252.

As previously stated, water for cooling the movable electrode, flowing in the coupling 250 and down the passageway 288, forces the movable electrode 21 to the right until it comes into contact with the fixed electrode 22. When electrode 21 moves to the right, it carries with it piston 254, for, as shown, piston 254 is clamped between flange 402 on sleeve 367 which abuts against the tapered portion of sleeve 360, and the threaded end 443 of sleeve 441 which is threaded to threaded end 364 of sleeve 360. Sleeve 360 as aforementioned is threaded to bushing 277 which is part of electrode 21. After contact is made between electrodes 21 and 22, it is necessary to move the movable contact 21 to the left again and to lengthen the arc path to provide dimensions which provide for optimum heating of the gas in the chamber. To provide for movement of the movable electrode away from the fixed electrode 22, that is to the left in FIG. 1, air is supplied to the chamber 253 formed by the aforementioned cylinder 401, and this air, pressing against the piston 254, causes the piston to move to the left, FIG. 1A, carrying with it the sleeves 367 and 360. As aforementioned, sleeve 360 is secured to the movable electrode 21.

A water header generally designated 410 has a flange portion 411 having a plurality of circular bores at spaced intervals around the periphery thereof, one of these bores being shown at 412. The bores 412 in flange portion 411 are aligned with a plurality of bores 414 in the aforementioned flange portion 400 of the cylinder generally designated 401. A plurality of spacer bars extend from the flange 411 to the flange 400, one of these bars being shown at 415, having nuts 416 and 417 adjustable as to their position on the threaded ends of the spacer bar 415 to precisely space the header and the cylinder, and having additional nuts 418 and 419 for securely fastening the spacer bar in place. The water header generally designated 410 is shown to have at the right-hand end thereof an additional flange portion 420, the outer annular surface of which fits snugly against the inner wall of the aforementioned cylinder 401. The flange portion 420 has an annular groove 421 therearound on the side thereof adjacent the piston 254, for containing a rubber gasket 456 to take up the shock of piston 254, and the flange portion 420 also has an additional cutaway portion around the periphery thereof on the same side to form an additional annular groove 422. In addition, flange portion 420 has a circular bore 423 passing therethrough in which is disposed one end of a push rod 424 having the other end thereof extending through a bore 425 in the aforementioned flange portion 411. The push rod 424 is seen to have a circular flange 426 thereon and to be biased in the right-hand direction by spring 427. The left-hand end of the push rod 424 is seen to be connected at 428 to the end of a lever 429 which is pivoted for rotation about a pin 430 mounted on a stud 431 extending from a microswitch generally designated 432. The microswitch 432 is secured to the aforementioned flange portion 411 by a bolt 433 passing through a threaded bore 434 in the flange. The other end of the lever 429 has a pin 435 thereon for engaging a contact arm 436 of the microswitch to operate the switch when the lever 429 is pivoted in a counterclockwise direction about the pin 430. This occurs when the piston 254 is forced to the left in cylinder 401 and to the position shown by pressure of air admitted through input 252. It is seen that the right-hand end of the push rod 424 abuts against the piston 254 in the position shown. Accordingly, the microswitch 432 is operated when the movable electrode 21 is returned to the left substantially as far as it will go, and the microswitch may be utilized in any convenient manner for one or more of a number of control purposes including cutting off the air supplied to inlet 252, and if desired turning on or off other inputs to the arc chamber.

The water header generally designated 410 is also seen to have disposed therein the aforementioned sleeve member 438 having an annular groove 439 with O-ring seal 440 at the left-hand end thereof, to have a central portion of somewhat reduced diameter 441 leaving a space 442 between the outer wall of the sleeve member 438 and the inner wall of the water header, and to have at the right-hand end thereof the portion of increased diameter 443. As aforementioned, the portion of increased diameter 443 is seen to abut against the piston 254 and the sleeve portion of increased diameter 443 is seen to have aforementioned internal threads engaging the threaded end 364 of the sleeve portion 363. This clamps the piston 254 in the position shown.

The water header 410 has a chamber 445 communicating with the aforementioned hydraulic insulator 251. Disposed inside of the aforementioned sleeve member 438 is an additional sleeve member 447 spaced therefrom to provide the annular passageway 448. The sleeve 447 extends through a bore 449 in the end of the header 410, with an O-ring seal 450 provided as shown, and thence the sleeve 447 is coupled by way of the elbow 451 to the aforementioned hydraulic input insulator 250. Inside of the aforementioned sleeve 447 in slidable engagement therein is the left-hand end of an elongated sleeve member 453 which has the right-hand end thereof threaded at 454 to make threaded engagement with the aforementioned internally threaded end of the coupling member 282 of electrode 21.

The aforementioned structure provides inlet and outlet passageways for the flow of cooling water to the electrode 21 and the flow of heated water therefrom. The passage of water to and from the electrode 21 may be traced as follows: water is supplied through the insulating terminal 250; elbow 451, thence through the sleeve 453 and down passageway 288, thence through the aforementioned apertures or openings 283 and 279, where the water divides, a portion of the water flowing into conduit 287 and thence around the spiral cooling channel 266, and a portion of the water which passes through openings 283 and 279 flowing through conduit 296 to the cooling coil 295. From these, water flows back through exit conduits, one of these being shown at 290, through the opening or passageway 280, through the partly annular space 285, and through the annular passageway 291 to the water header 410, where the water flows through the annular passageway 448 to the outlet chamber 445, and thence out through the outlet hydraulic insulator 251.

Certain features of the movable electrode and the structure for moving the same are described and claimed in a copending application of Charles B. Wolf for "Movable Electrode for Arc Heater," Ser. No. 518,596, filed Jan. 4, 1966, and assigned to the assignee of the instant invention.

There has been provided, then, apparatus well suited to accomplish the aforedescribed objects of the invention, which are to provide an arc chamber for efficiently increasing the enthalpy of a gas admitted to the chamber by heating the same with an electric arc, and providing an exhaust for the heated gas. In the operation of the chamber, air at for example 3,000 pounds per square inch pressure is admitted through the air inlet device 309, thence it flows through the passageway 308 and spaces 306 and around the movable electrode 21. An arc exists between the electrodes 21 and 22 while current is supplied by way of one connection to the input cable connection 99 and by way of the terminal plate 373. The field coils 13 and 16 are energized to setup opposing fields so that the result is a field transverse to the direction of the arc between electrodes 21 and 22. By suitable energization of the coils, the magnetic field may be made such as to cause the arc to continuously move in a circular path over the electrodes 21 and 22. The aforedescribed chamber wall consisting of the stack of plates insulated from each other and cooled by annular passageways provides for efficient cooling of the arc chamber walls while providing an arrangement which reduces to a minimum the possibility of the arc striking to the disc or plates and forming an electrical passageway therethrough. The heated gas is exited through the vent 42.

The tank structure including the end covers and the cylindrical wall portion is insulated from both electrodes. Although water header 410 is at the potential of one electrode, it does not provide a current path.

Whereas we have shown and described our invention with respect to an embodiment thereof which gives satisfactory results, it should be understood that changes may be made and equivalents substituted without departing from the spirit and scope of our invention.

We claim as our invention:

1. In arc heater apparatus, in combination, means including wall means forming an arc chamber having first and second fluid cooled annular electrodes therein, means for bringing electrical energy to the electrodes to produce an arc therebetween, and magnetic field producing means disposed near the electrodes for producing a magnetic field which causes said arc to rotate in an annular path around the arcing surfaces of the annular electrodes, the chamber having means for admitting gas thereto and means for exiting gas therefrom, the means for admitting gas providing that said gas is admitted at a plurality of points in a circular entrance path around the outside of said first electrode and near the annular arc path, said means for exiting gas including an exhaust vent for exiting only gas which passes through the annular arc path and through the inside of the second annular electrode, the wall means of the arc chamber including a plurality of stacked axially aligned rings, each ring being electrically insulated from the adjacent rings on both sides thereof, the rings having an inside diameter greater than the outside diameter of the electrodes and substantially enclosing the space between electrodes whereby direct radiation from the arc reaches only the electrodes, the rings of the chamber wall means, and the exiting means.

2. Arc heater apparatus according to claim 1 wherein the rings are additionally characterized as each having an annular passageway therein with an inlet and an outlet for the annular passageway, and including in addition means for conducting a cooling fluid to the inlets of the annular passageways, and means for conducting the fluid from the outlets of the annular passageways.

3. Arc heater apparatus according to claim 1 including in addition a plurality of spacer members composed of electrically insulating material, there being at least one spacer member disposed between each pair of adjacent rings, and wherein the rings are additionally characterized as having an annular tongue extending therearound on one side thereof and having an annular groove extending therearound on the other side thereof, the tongue of one ring extending into the groove of the adjacent ring without touching the adjacent ring and protecting the spacer member between the adjacent rings from direct radiation from the arc between the first and second electrodes.

4. Arc heater apparatus according to claim 1 including in addition means for clamping the rings of the wall means together and wherein the rings are additionally characterized as containing an inner portion composed of copper and an outer portion composed of a non-magnetic metal less deformable than copper and having the clamping forces of the clamping means applied thereto.

5. In an arc heater having means forming an arc chamber containing a pair of spaced annular electrodes between which the arc occurs, the means forming the arc chamber including a wall for enclosing the arc chamber, in combination, a plurality of axially aligned rings of substantially the same diameter which is at least as great as the outside diameter of the annular electrodes and arranged in a stack to provide a chamber wall portion substantially enclosing the space between the electrodes but not restricting the path of the arc, a plurality of gaskets composed of insulating material disposed between the plurality of rings respectively whereby each of the rings is insulated from the adjoining rings on both sides thereof, each of the rings being composed of an inner portion and an outer portion, the inner portion being composed of material which is highly conductive of heat, the outer portion being composed of non-magnetic material which is strong relative to the inner portion, each ring having an internal annular passageway therein for the flow of a cooling fluid, the passageway lying at least partially in the inner portion of the ring, the outer portion of each ring having inlet and outlet passageways therethrough communicating with the annular passageway in the ring, a first inlet header connected to the inlet passageway of each of the rings for bringing a cooling fluid having low conductivity to the annular passageway, and a second header connected to the outlet passageway of each of the rings for conducting a cooling fluid from the annular passageway, the first and second headers being composed of non-conductive material.

6. Arc heater apparatus according to claim 1 wherein the rings are additionally characterized as being fluid cooled.

7. Arc heater apparatus comprising, in combination, means forming an arc chamber having a chamber wall, first and second electrodes disposed in said chamber, first and second connected to the first and second electrodes respectively for bringing electrical current to the electrodes, and producing an arc therebetween means for admitting gas under pressure into the chamber at one end thereof and for exhausting the gas from the chamber at the other end thereof after being heated by the arc, means for setting up a magnetic field of predetermined strength between the first and second electrodes and having a predetermined angular position with respect to the arc whereby the magnetic field rotates the arc in an annular path, means for preventing heat created by the arc from damaging the walls of the chamber by convection and by direct radiation, the last-named means consisting of a heat shield composed of a plurality of similar interchangeable rings arranged in a stack and interposed between the chamber wall and the arc, each of the rings including at least a portion thereof composed of a substantance which is highly heat conductive, a plurality of washers disposed between the plurality of rings respectively and insulating each ring from the adjacent rings on both sides thereof, each of the rings having a circular passageway therein for the passage of a cooling fluid, means connected to all of the rings for bringing a cooling fluid to the rings, and means connected to all of the rings for conducting the fluid from the rings after the fluid has passed through the circular passageway.

8. Apparatus according to claim 7 wherein each of the rings is additionally characterized as having an annular tongue therearound extending a predetermined distance from the surface thereof, and each of the rings is additionally characterized as having an annular groove therein extending therearound, the tongue of one ring extending into the groove of the adjacent ring without making contact and electrical connection with the adjacent ring, the tongues being located between the washers and the electrodes and preventing direct radiation from the arm from reaching the insulating washers.

9. In arc heater apparatus, in combination, means forming an enclosed arc chamber, said means including first and second spaced annular electrodes, a heat shield located axially therebetween, and nozzle means at one end of the chamber and having a throat portion, means for bringing electrical current to the first electrode and to the second electrode to produce an arc therebetween, means for substantially continuously moving the arc in an annular path around the arcing surfaces of the first and second annular electrodes, means for admitting gas to the arc chamber in a substantialy annular gas flow path around the outside of at least one of said electrodes, said gas only after passing through the arc path entering the throat portion of the nozzle means, said heat shield comprising a plurality of fluid cooled rings composed at least in part of highly heat conductive material, a plurality of electrically insulating gaskets disposed between the plurality of rings respectively and insulating each ring from the adjacent rings on both sides thereof, said rings and gaskets being formed into a stack which extends between the two electrodes and receives radiation from the arc, the heat shield providing an unrestricted arc path between the first and second annular electrodes.

10. Arc heater apparatus according to claim 9 wherein the rings are additionally characterized as each having a circular passageway extending therearound inside the ring, said circular pasasgeway being disposed near the surface at the inside of the ring, and means for supplying cooling fluid to and conducting fluid from the circular passageways of all of the rings.

11. A heat shield for use in an arc chamber of the type where gas under pressure is admitted to the chamber wherein it is heated by an electrical arc and exhausted under pressure from the chamber, heat energy being normally conducted away from the arc by radiation, convection and conduction, the heat shield consisting of a plurality of interchangeable substantially identical rings disposed in unbroken stacked axial alignment, each ring having an inner portion of relatively small diameter composed of highly heat conductive material and an outer portion of relatively large diameter composed of a material strong relative to the material of the inner portion, the inner portion of each ring having an internal annular passageway therein, each of the outer ring portions having an inlet conduit for bringing fluid to the annular passageway and an exit conduit for conducting fluid from the annular passageway, and a plurality of insulating gaskets disposed between the plurality of rings respectively.

12. A heat shield according to claim 11 wherein each of the rings is additionally characterized as having an annular tongue extending therefrom and each ring is additionally characterized as having an annular groove extending therearound, the tongue of one ring extending into the groove of the adjacent ring while the rings are mounted in the stack without making contact with the adjacent ring, the tongues preventing direct radiation from the arc from reaching the insulating gaskets.

13. Apparatus according to claim 11 including in addition an inlet water header common to all of the rings, the inlet water header being composed of insulating material and having a plurality of conduits connecting the header to the inlet conduits of the rings, an outlet water header common to all of the rings and having a plurality of other conduits connecting the outlet water header with the outlet conduits of the plurality of rings, the inlet water header supplying substantially pure water to the annular passageways in the rings for cooling the rings, the water forming a path of very low conductivity between each ring and all of the other rings of the stack to provide uniform distribution of electrical stress between the rings of the heat shield.

14. Apparatus according to claim 11 additionally characterized as having a preselected number of rings in accordance with the potential drop across the arc whereby the potential drop divided by the number of rings is limited to a low value.

15. Arc heater apparatus comprising, in combination, a pressure vessel, a movable electrode and a fixed electrode disposed in the pressure vessel, both the electrodes being electrically insulated from the pressure vessel, a heat shield consisting of a plurality of stacked alternate rings and electrically insulating gaskets interposed between the arc path between electrodes and the wall of the pressure vessel and forming an arc chamber, means for cooling the plurality of rings, both of the electrodes having passageways therethrough for the flow of a cooling liquid, means for bringing a cooling fluid to the fixed electrode and conducting the fluid from the fixed electrode, means for bringing a cooling fluid to the movable electrode and for conducting fluid from the movable electrode, said movable electrode being adapted to be moved by the pressure of the cooling fluid brought thereto into contact with the fixed electrode to start the arc, piston means operatively connected to the movable electrode, and means for applying an additional fluid under pressure to the piston means after the arc is started to move the movable electrode to an operating position and to maintain the movable electrode in the operating position against the force of the cooling fluid applied thereto.

16. A heat shield suitable for use in an arc chamber comprising, in combination, a plurality of similar metal rings of similar diameter, and a plurality of gaskets composed of insulating material, the rings and gaskets being disposed in the form of a stack, there being one gasket between each adjacent pair of rings and insulating each ring from the rings on both sides thereof, each of the rings having a circular passageway therein extending therearound, each of the rings having an inlet conduit connected to the circular passageway adapted to bring a cooling fluid to the circular passageway, each of the rings having an outlet conduit connected to the circular passageway adapted to conduct fluid from the circular passageway, each ring having an annular tongue extending therearound at a predetermined position thereon, each ring having an annular groove therein extending therearound at a predetermined position therein, the tongue of one ring extending into the groove of the adjacent ring without making contact with the adjacent ring and without making electrical connection therewith, the tongues preventing radiation from an arc in the chamber from reaching the insulating gaskets and degrading the material thereof.

References Cited
UNITED STATES PATENTS

| | | | |
|---|---|---|---|
| 1,871,746 | 8/1932 | Schenkel | 313—33 |
| 2,525,938 | 10/1950 | Peck | 313—146 |
| 3,048,736 | 8/1962 | Emmerich | 313—231 |
| 3,073,984 | 1/1963 | Eschenbach et al. | 313—30 |
| 3,140,421 | 7/1964 | Spongberg | 315—111 |
| 3,146,371 | 8/1964 | McGinn | 315—111 |
| 3,201,560 | 8/1965 | Mayo et al. | 313—231 |

DAVID J. GALVIN, *Primary Examiner.*